Jan. 26, 1960  S. B. BROUSE ET AL  2,922,359
KNOTTER FOR AUTOMATIC WIRE-TYING MACHINE
Filed Jan. 16, 1958  11 Sheets-Sheet 5
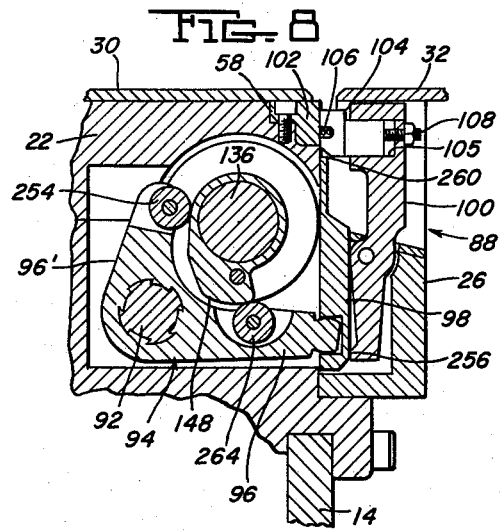
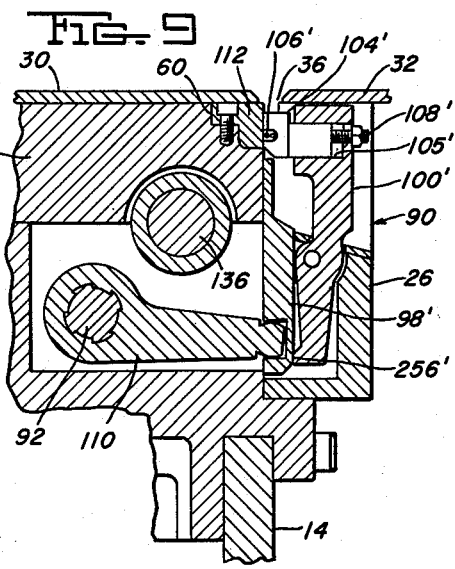
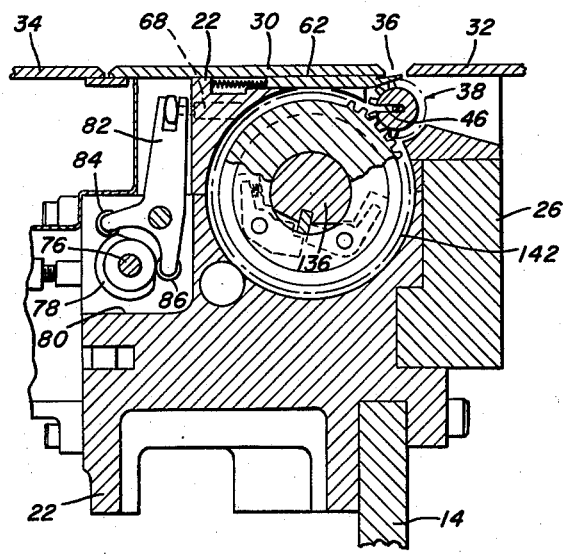
INVENTORS
SHIRLEY B. BROUSE and
PAUL W. FAWCETT
BY Donald G. Dalton
Attorney Jan. 26, 1960 S. B. BROUSE ET AL 2,922,359
KNOTTER FOR AUTOMATIC WIRE-TYING MACHINE
Filed Jan. 16, 1958 11 Sheets-Sheet 6
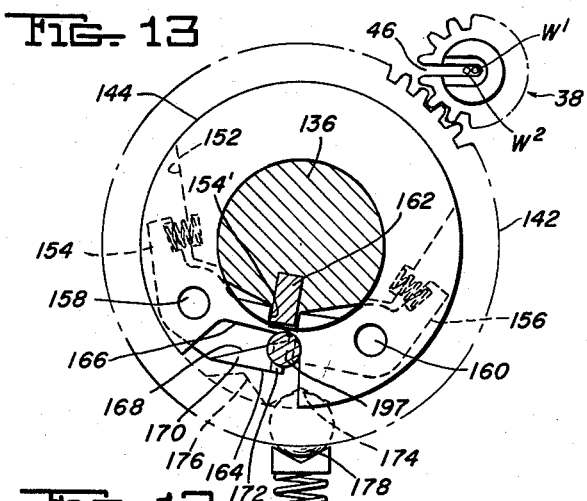
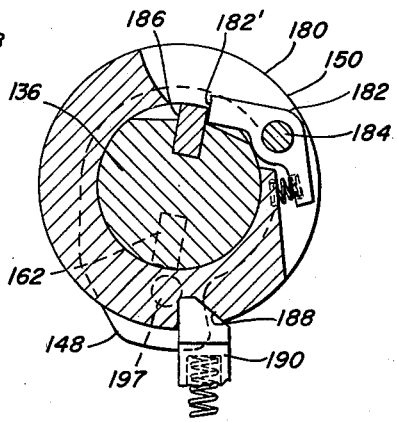
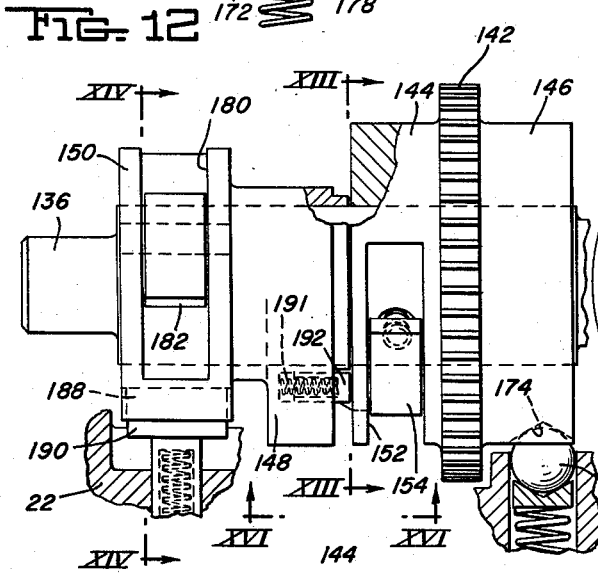
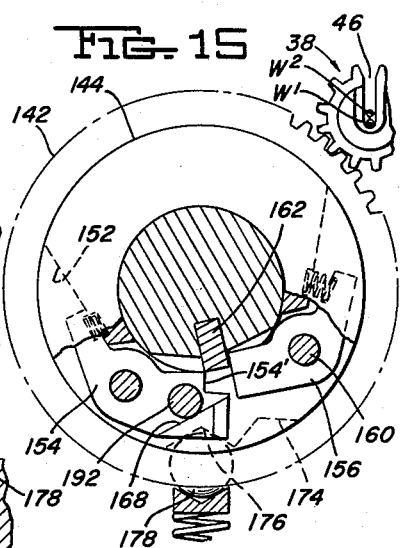
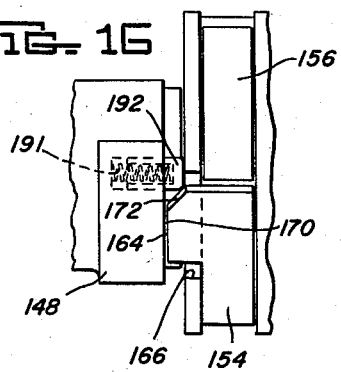
INVENTORS
SHIRLEY B. BROUSE and
PAUL W. FAWCETT
BY Donald G. Dalton
Attorney

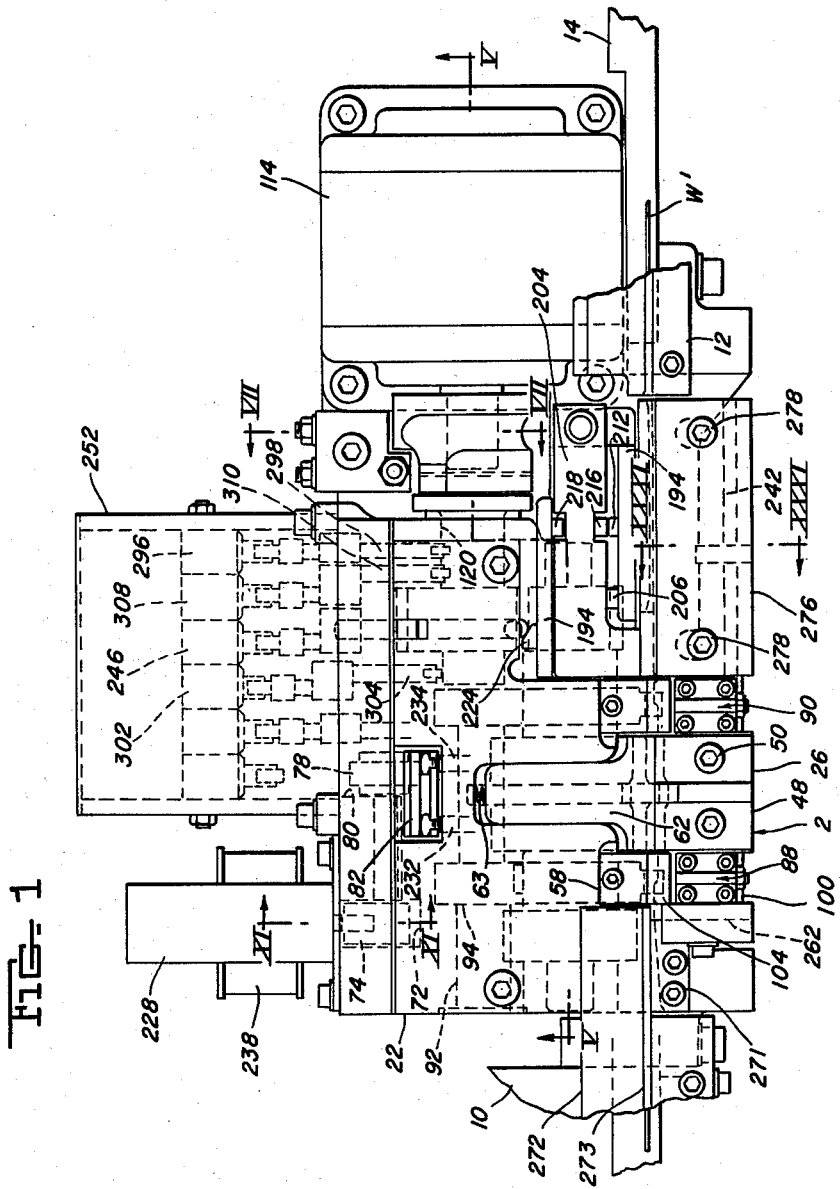

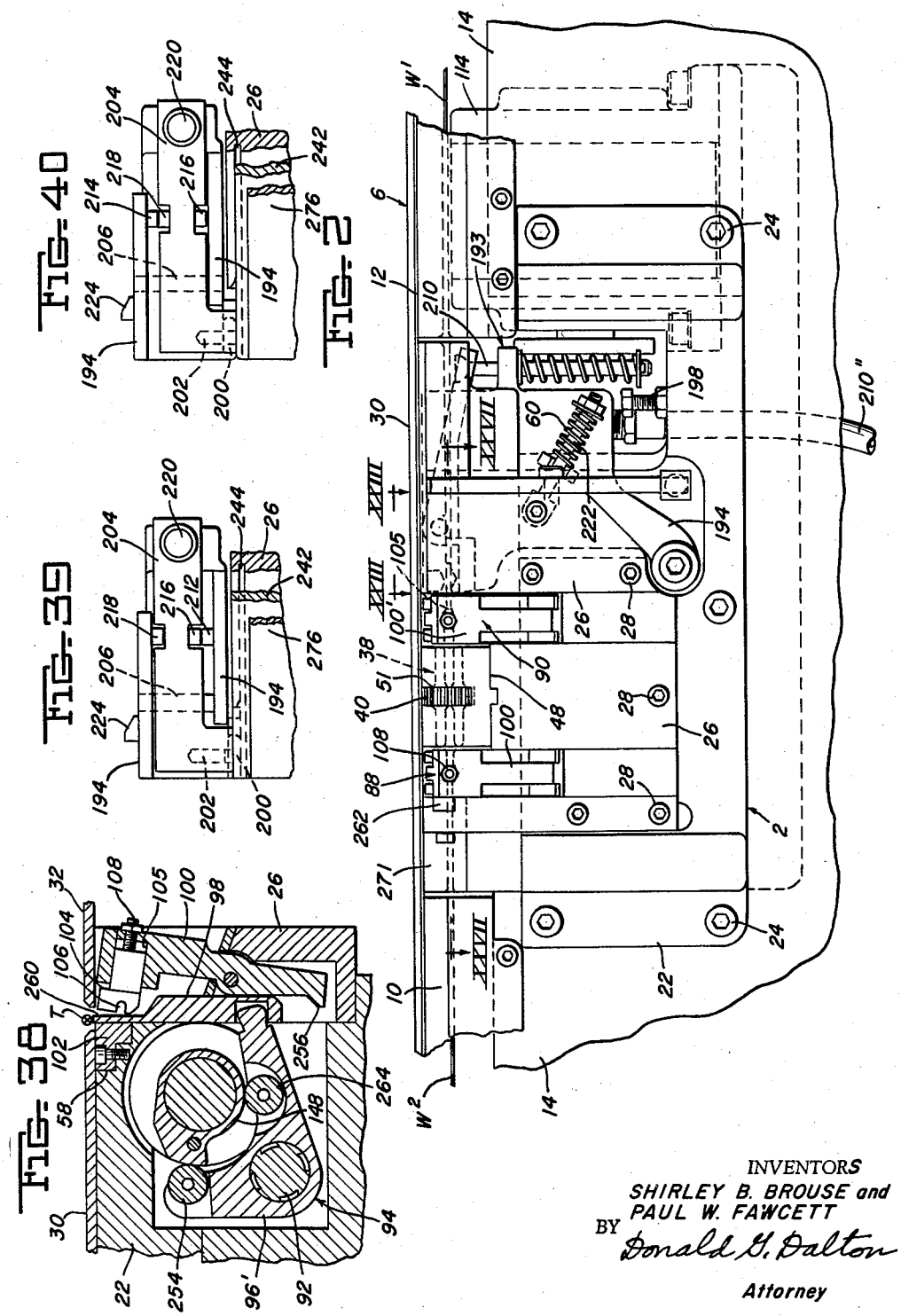

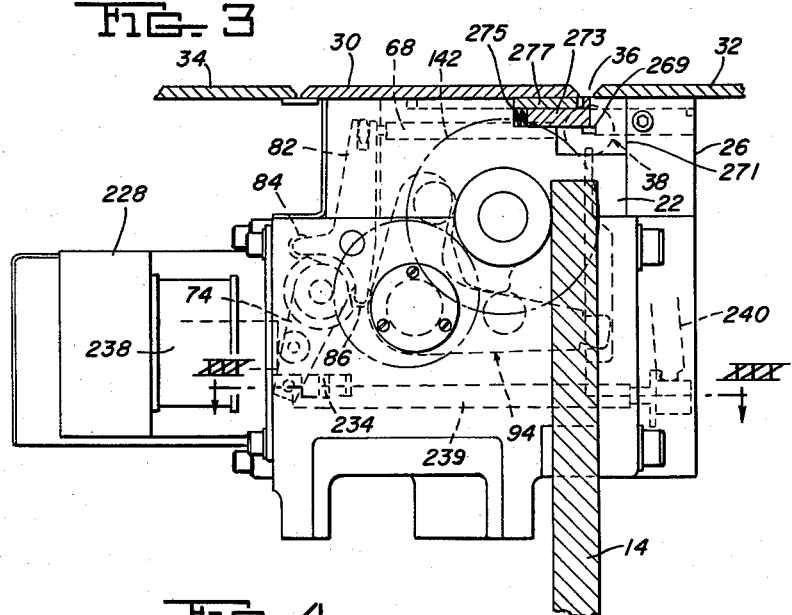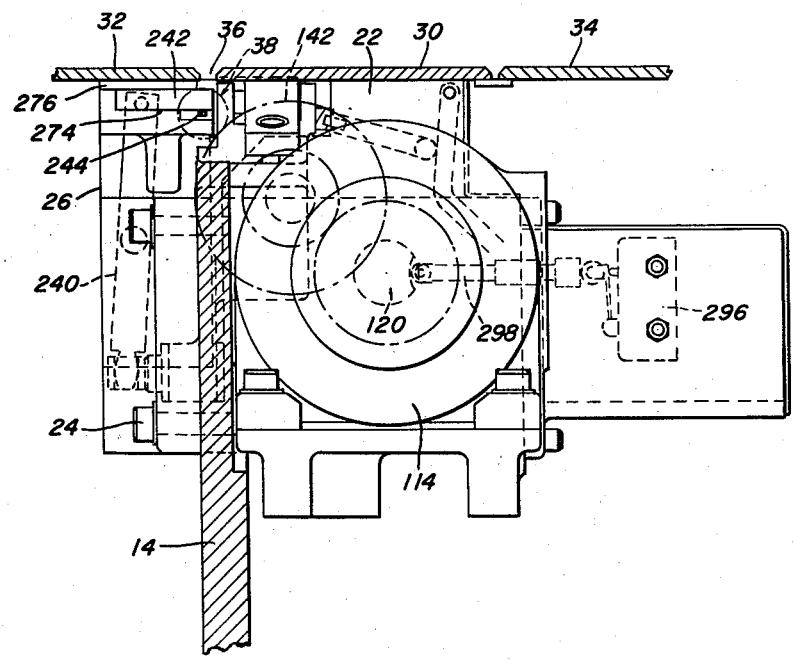

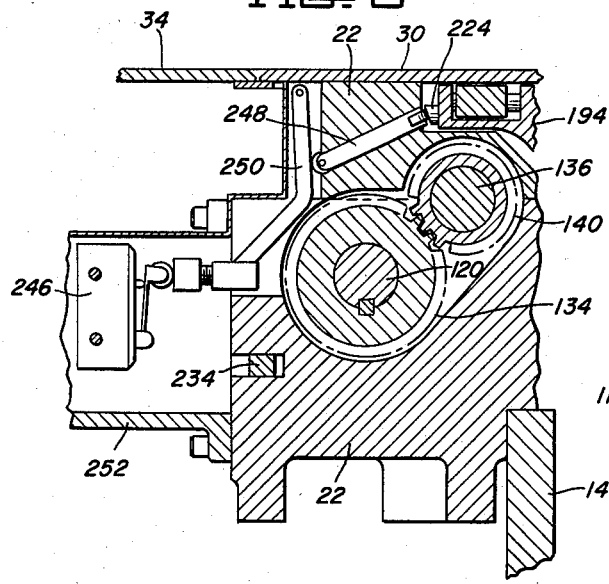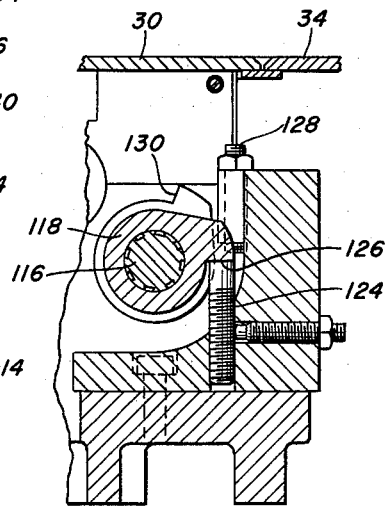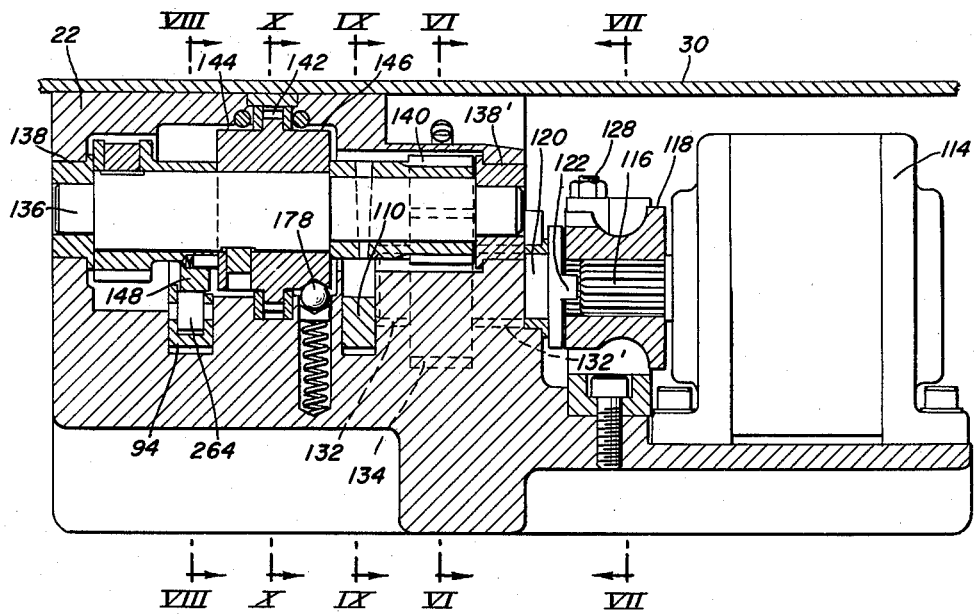

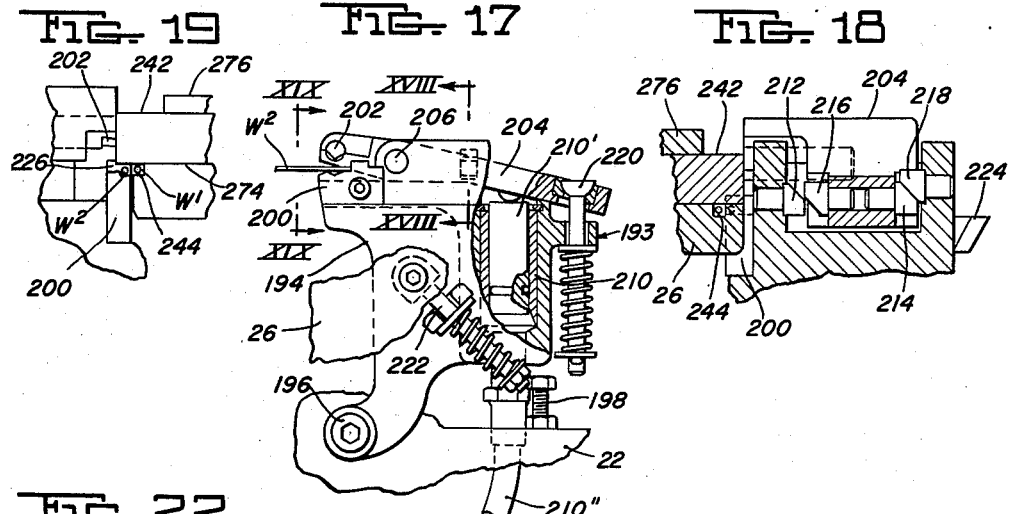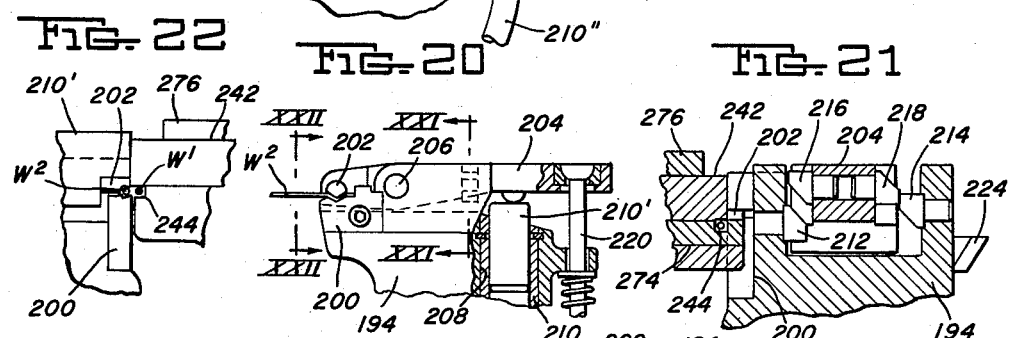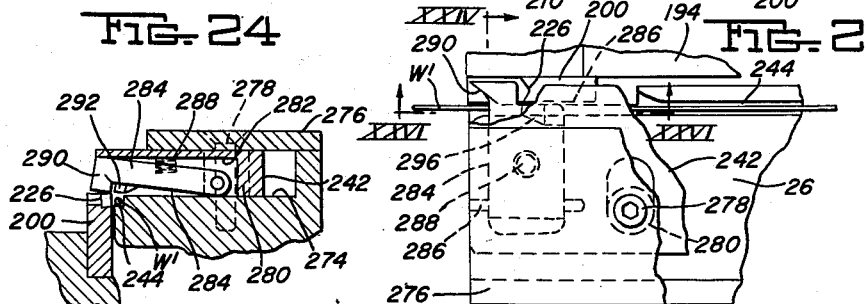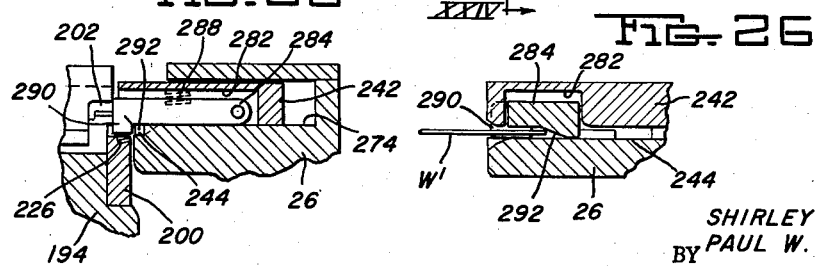

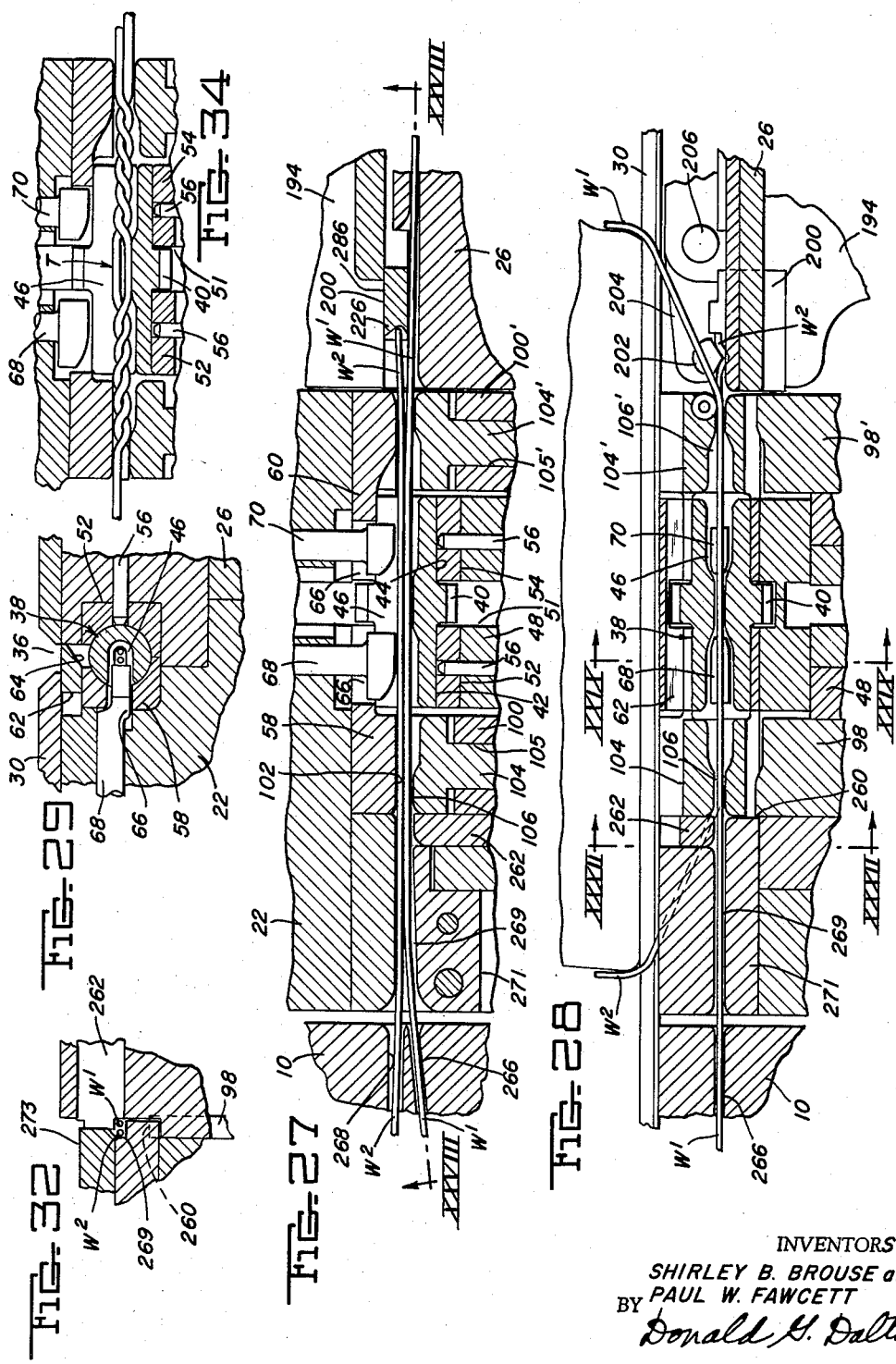

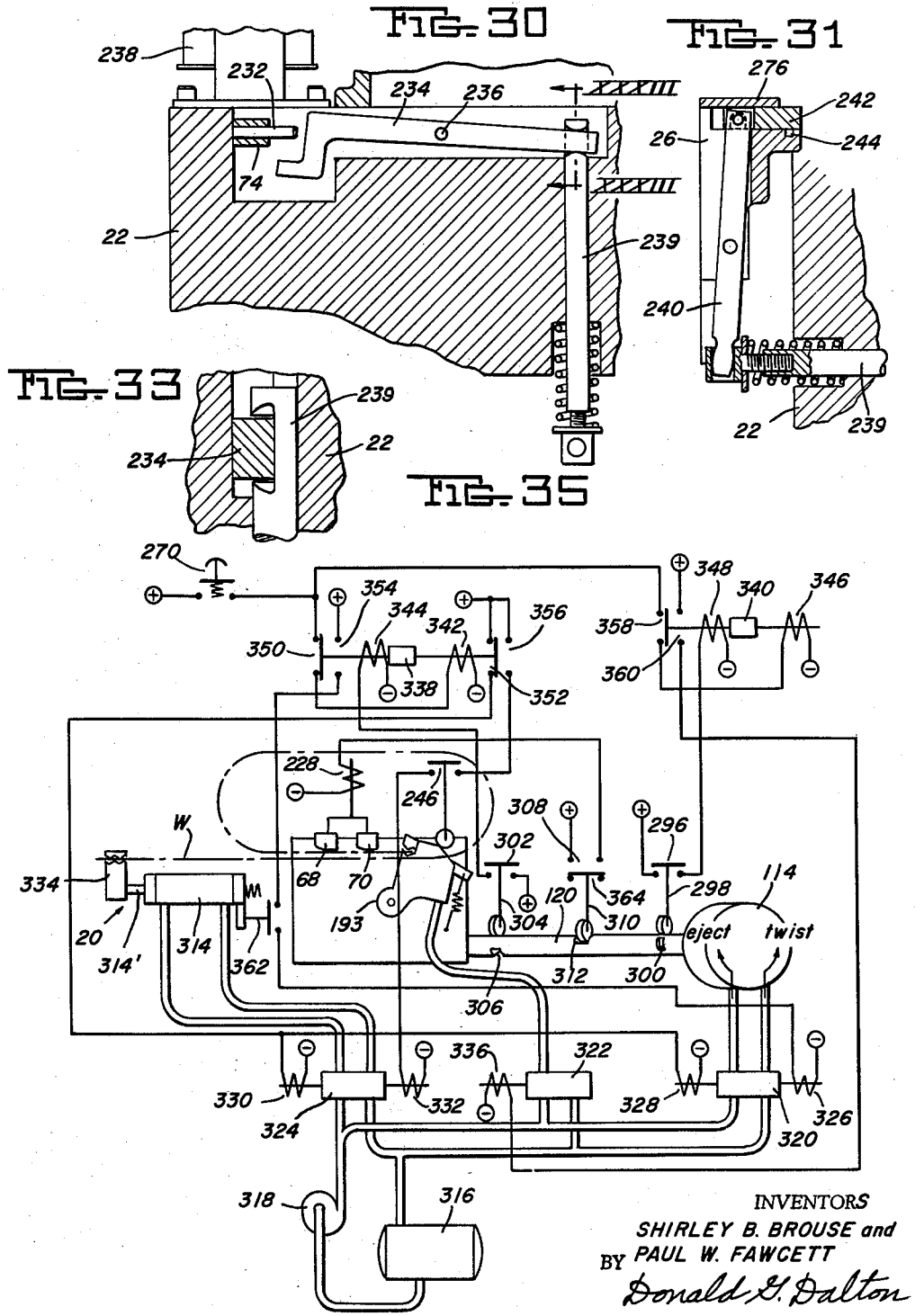

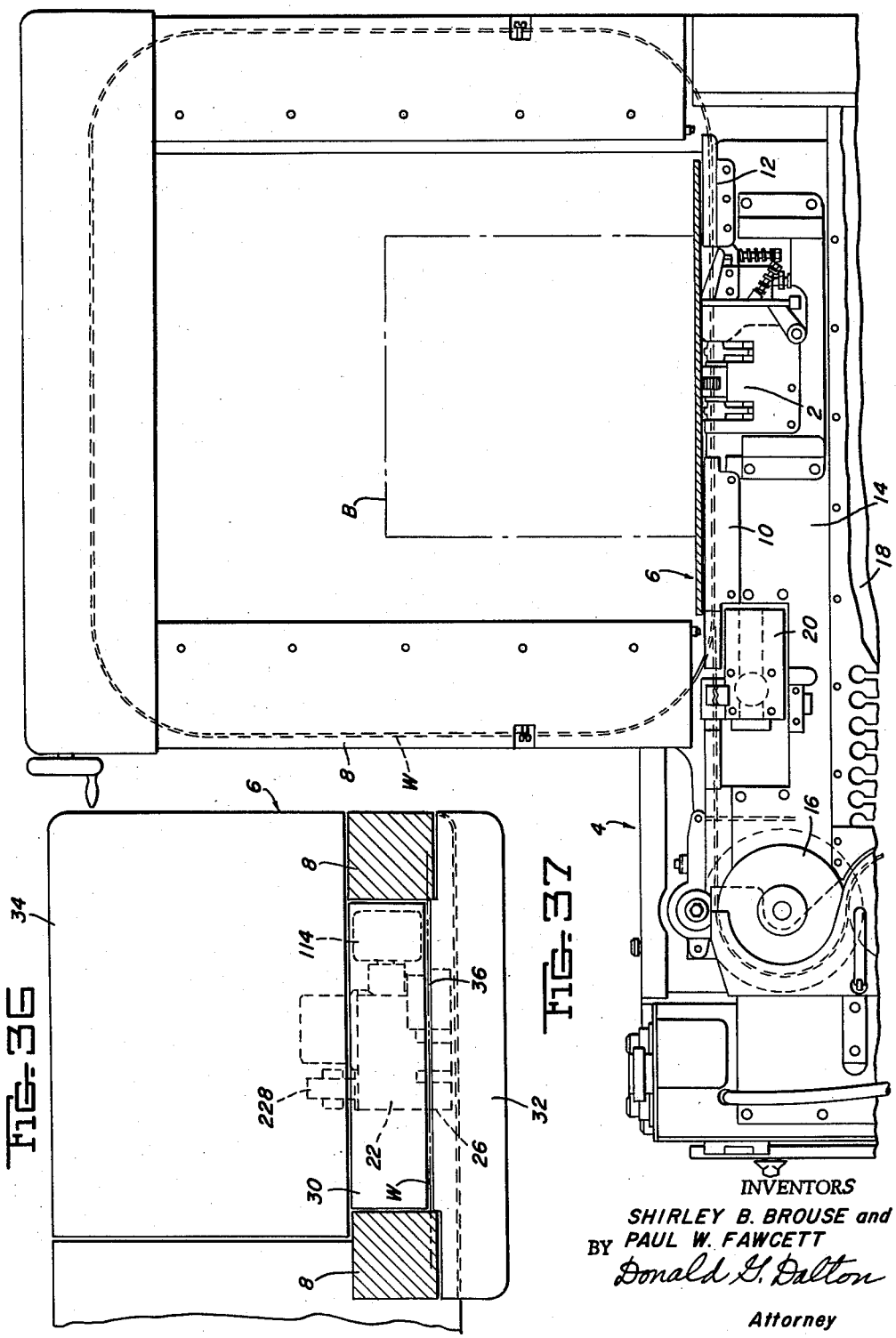

Jan. 26, 1960  S. B. BROUSE ET AL  2,922,359
KNOTTER FOR AUTOMATIC WIRE-TYING MACHINE
Filed Jan. 16, 1958  11 Sheets-Sheet 11

INVENTORS
SHIRLEY B. BROUSE and
PAUL W. FAWCETT
BY
Donald G. Dalton
Attorney

United States Patent Office 2,922,359
Patented Jan. 26, 1960

2,922,359

KNOTTER FOR AUTOMATIC WIRE-TYING MACHINE

Shirley B. Brouse, Chicago, and Paul W. Fawcett, Western Springs, Ill., assignors to United States Steel Corporation, a corporation of New Jersey Application January 16, 1958, Serial No. 709,231

27 Claims. (Cl. 100—26)

The present invention relates generally to apparatus for automatically applying a wire tie around a package or bundle, drawing the wire tie taut, and knotting (i.e., twisting) the ends of the tie wire to secure it around the package or bundle. An example of one machine of this general type is disclosed by Vining et al. Patent No. 2,416,859.

More particularly, the present invention relates to the means for forming the knot in the tie and has for its primary object the provision, in an automatic wire-tying machine, of an improved mechanism for knotting the overlapped end portions of an encircling wire tie after the tie has been drawn taut around the package, and then cutting and ejecting the completed tie after the knot has been formed.

Another object of the invention is to provide a knotter mechanism having a slotted twister pinion with means whereby it is automatically positioned with the side opening of its slot in a horizontal position for receiving and guiding the tie wire prior to the knotting or twisting operation and in a vertical position after the knot is formed, to facilitate ejection of the tie.

Another object of the invention is to provide a knotter mechanism wherein the twister pinion and knot-ejector elements are operated in proper sequence by a single power shaft.

It is a further object of the invention to provide a knotter mechanism having an ejector element incorporating a shearing means whereby the knot is automatically cut from the wire source as it is being ejected from the knotter.

Another object of the invention is to provide a knotter mechanism having a gripper therein for gripping one end of a package-encircling loop of tie wire so that the wire tie can be drawn taut around the package prior to the knotting operation.

It is another object of the invention to provide a knotter mechanism having a gripper therein as set forth above, which functions to move out of the ejection path of the knot as it releases the gripped end of the tie wire, so that no waste is formed when the knot is ejected and cut off.

It is a further object of the invention to provide an electrical control circuit whereby the various operations of the knotter mechanism are performed automatically in proper sequence.

These and other objects will become more apparent on referring to the following specification and the accompanying drawings in which:

Figure 1 is a plan view of the knotter with table surface plates removed;

Figure 2 is a front elevational view;

Figure 3 is an end view looking toward the left of Figure 2 showing the left end of the knotter;

Figure 4 is an end view looking toward the right of Figure 2 showing the right end of the knotter;

Figure 5 is a longitudinal sectional view taken along line V—V of Figure 1;

Figure 6 is a cross-sectional view taken along the line VI—VI of Figure 5;

Figure 7 is a cross-sectional view taken along the line VII—VII of Figure 1 and Figure 5;

Figure 8 is a cross-sectional view taken along the line VIII—VIII of Figure 5;

Figure 9 is a cross-sectional view taken along the line IX—IX of Figure 5;

Figure 10 is a cross-sectional view taken along the line X—X of Figure 5;

Figure 11 is a cross-sectional view taken along the line XI—XI of Figure 1;

Figure 12 is an enlarged detail view of a portion of Figure 5 showing the twister pinion drive shaft, gear and cam with parts broken away for clarity;

Figure 13 is a cross-sectional view taken on the line XIII—XIII of Figure 12;

Figure 14 is a cross-sectional view taken on the line XIV—XIV of Figure 12;

Figure 15 is a view similar to Figure 13 showing parts of the knotter in ejecting position;

Figure 16 is an elevational view taken on the line XVI—XVI of Figure 12;

Figure 17 is an elevational view of the tiltable gripper of the knotter with parts broken away for clarity;

Figure 18 is a cross-sectional view to a larger scale taken on the line XVIII—XVIII of Figure 17;

Figure 19 is an elevational end view to a larger scale taken on the line XIX—XIX of Figure 17;

Figure 20 is a partial view similar to Figure 17 showing the jaws of the gripper in closed position;

Figure 21 is a cross-sectional view to a larger scale taken on the line XXI—XXI of Figure 20;

Figure 22 is an elevational end view taken along the line XXII—XXII of Figure 20;

Figure 23 is a plan view taken along the line XXIII—XXIII of Figure 2 with the table surface plate removed;

Figure 24 is a cross-sectional view taken along the line XXIV—XXIV of Figure 23;

Figure 25 is a view similar to Figure 24 showing the parts in an alternate position;

Figure 26 is a longitudinal sectional view taken along the line XXVI—XXVI of Figure 23;

Figure 27 is a longitudinal sectional view taken along the line XXVII—XXVII of Figure 2;

Figure 28 is a vertical sectional view taken along the line XXVIII—XXVIII of Figure 27;

Figure 29 is a cross-sectional view taken along the line XXIX—XXIX of Figure 28;

Figure 30 is a horizontal sectional view taken along the line XXX—XXX of Figure 3;

Figure 31 is a cross-sectional view taken along the line XXXI—XXXI of Figure 1;

Figure 32 is a cross-sectional view taken along the line XXXII—XXXII of Figure 28;

Figure 33 is an enlarged detail sectional view taken along the line XXXIII—XXXIII of Figure 30;

Figure 34 is a partial view similar to Figure 27 with parts in alternate position showing a knot;

Figure 35 is a simplified control circuit;

Figure 36 is a plan view of the table of the tying machine;

Figure 37 is a front elevational view of the tying machine;

Figure 38 is a sectional view similar to Figure 8 with parts in alternate position to show ejection of a completed tie;

Figure 39 is a plan view of Figure 17;

Figure 40 is a plan view of Figure 20;

Figure 41:
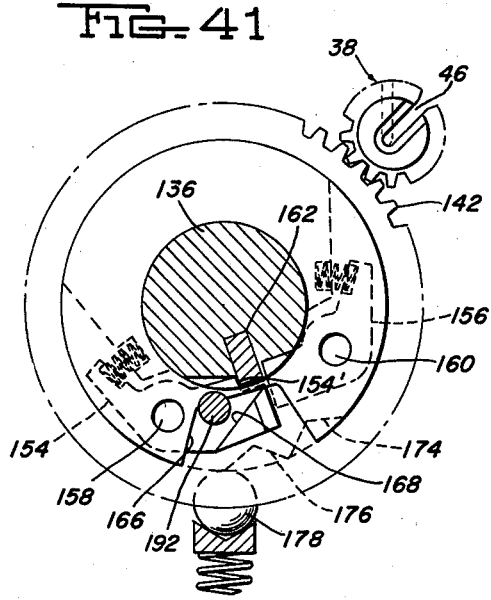
Figure 41 is a view similar to Figure 13 with parts in position at the end of the twist rotation plus overtwist.

Referring more particularly to the drawings, the knotter mechanism of the invention, for purposes of illustration, is shown generally at 2 incorporated in an automatic wire-tying machine 4. As shown in Figures 36 and 37, the wire-tying machine 4 includes a table 6 having a guide track 8 upstanding thereon. The guide track 8 includes an elevated portion in the form of an arch or gate and a bottom portion parallel with table 6. The bottom portion of the guide track includes a left-hand guide block 10 and a right-hand guide block 12 disposed adjacent opposite ends of the knotter mechanism 2. Knotter mechanism 2, guide blocks 10 and 12 and other elements of the tying machine are mounted on a vertically disposed plate 14 which is secured to the main frame of the machine normal to and below the table 6, as best shown in Figure 37. Other elements of the machine include a pinch-roll feeding mechanism 16, a pocket or escapement 18, and a tensioner 20 operated by a fluid-pressure cylinder.

A brief description of the general operation of the tying machine 4 is interposed at this point to aid in an understanding of the detailed description of the knotter of the invention which follows.

Prior to initiation of a tying cycle, the leading end of a tie wire W (Figure 37) is fed into the machine by the feeding pinch rolls 16 from a supply coil (not shown). As the wire is fed in, the leading end thereof is pushed from left to right as shown in Figure 37 through the tensioner 20, guide block 10, knotter 2, guide block 12, around the upper portion of guide 8, and then through the guide block 10 and the knotter a second time. For purposes of clarity the portion of the tie wire W which passes through the guide block 10 and the knotter 2 a second time will be designated $W^2$ while the portion of the wire W which passes through the block 10 and the knotter only the first time will be designated $W^1$.

The overlapping portions $W^1$ and $W^2$ of wire W are disposed in two separate grooves in the guide block 10 and in contiguous position in the slot of a twister pinion 38 (Figures 28 and 29) of the knotter 2 after feeding. After the supply of tie wire has been thus fed into the tying machine, the machine is ready to be operated for applying ties around bundles B.

Bundles B are moved sequentially under the arch of the guide track 8 by means of roller conveyors (not shown) and are stopped one or more times under the arch for the application of a tie T. As each bundle moves into tying position, the wire-end $W^2$ is held by a tiltable gripper 193 in the knotter and the feeding pinch rolls 16 are reversed to pull the wire W from right to left as viewed in Figure 37. As the resulting retraction, the surplus length of wire is pushed into escapement 18. As the wire is retracted, the loop thereof initially stored in the upper portion of the guide track, is pulled out of the track and around the bundle. After the wire has been drawn around the bundle, the pinch rolls 16 are disengaged from the wire and the tensioner 20 is actuated to draw the wire taut around the bundle and impart thereto a predetermined tension. When the desired tension has been achieved, the knotter pinion 38 is actuated to twist the overlapping portions of the tie wire together and form a knot on the bottom side of the bundle. After this has been done the portion $W^1$ of the tie wire W is cut and the completed tie is ejected from the knotter. Wire for the next tie is then fed into the machine so that the tying cycle may be repeated.

The parts of the machine thus far described, with the exception of the knotter, are not part of the present invention and are not claimed herein but have been shown and will be described more fully hereinafter only to the extent necessary for a clear understanding of the present invention. Typical elements of an automatic wire tying machine are disclosed in our co-pending applications, Serial No. 623,458, filed November 20, 1956, and Serial No. 662,245, filed May 28, 1957. The former discloses and claims a feeding mechanism and escapement arrangement for an automatic wire-tying machine, while the latter covers a tensioner for such a machine. Co-pending Fawcett application, Serial No. 656,282, filed May 1, 1957, discloses and claims a guide track and compressor for an automatic wire-tying machine. The details of the knotter mechanism of the present invention will now be described.

As shown in Figures 1 and 2, knotter mechanism 2 includes a split body consisting of a main rear housing 22 secured to plate 14 by screws 24 and a front housing 26 affixed to the rear housing by screws 28. The split body made up of the housings 22 and 26 encloses and supports the various elements of the knotter mechanism. It is disposed beneath the surface of table 6 and extends parallel therewith (Figure 2). The surface of table 6 above knotter 2 consists of a removable plate 30 disposed between and parallel with plates 32 and 34 (Figure 36). Plate 30 overlies rear housing 22 and is spaced slightly from front plate 32, which overlies front housing 26, to provide an escape groove 36 above the path of the wire W through the knotter. Plate 30 is removably secured in place to provide access to the knotter for maintenance purposes.

Further details of the invention will be described under separate headings for greater clarity and ease of understanding.

*General arrangement*

The principal elements of the knotter, each of which will be more specifically described hereinafter, are in a slotted twister pinion, knot-ejector units adjacent the ends of the twister pinion, drive shafts connected with and powered by a reversible hydraulic motor, a gear and cam on one of the drive shafts for operating the twister pinion and ejector units, and a tiltable gripper for holding the leading end of the wire W. As explained above, prior to the knotting operation proper, the tie wire has been drawn out of the guide track around the bundle and has been tensioned to the desired degree of tautness, the leading end of the tie wire being held in the tiltable gripper. At this point the overlapped portions of the tie-wire loop are confined in the slot of the twister pinion. The twister pinion is then rotated to twist the overlapped portions of the wire and form the knot in the tie. After the knot is formed, it is ejected from the twister pinion upwardly against the bottom of the bundle by the ejector units. As the knot is being ejected, the gripped end of the wire is released and the knot is cut from the supply coil by shearing action between one of the ejector units and a fixed shear edge mounted in the knotter.

*Slotted twister pinion*

Figure 43:
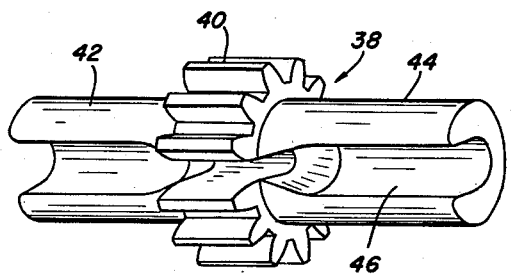
Figure 43 is a perspective view of the twister pinion.

The twister pinion 38 includes a tooth body portion 40, having elongated hubs 42 and 44 integral therewith (Figure 43). The pinion has a radial slot 46 therein and the hubs have longitudinal slots of quarter width aligned therewith. The depth of slot 46 is sufficient to accommodate overlapping portions $W^1$ and $W^2$ of wire W, one on each side of the longitudinal center line of the pinion (Figures 13, 15 and 32). The slots in the hubs 42 and 44 provide clearance to accommodate the completed knot (Figures 34 and 43). The pinion 38 is journaled in the upper portion of rear housing 22 with the slot 46 extending longitudinally in the path of portions $W^1$ and $W^2$ of the tie wire W (Figures 2, 27 and 28).

The upper portion of front housing 26 is in the form of a slotted block 48 removably affixed to the main portion of front housing 26 by means of screws 50 (Figures 1, 2, 27, 28 and 29). The block 48 is slotted vertically as at 51 to accommodate the tooth portion 40 of pinion 38. Block 48 contains spaced bearings 52 and 54 maintained in position by means of pins 56. Rear housing 22 contains a left-hand bearing 58 and a right-hand bearing 60 for the hubs of pinion 38 opposite bearings 52 and 54, respectively. Bearings 52 and 58 cooperate to journal the hub 42 of pinion 38 while bearings 54 and 60 cooperate to journal hub 44 (Figures 27 and 29).

A cover plate 62 biased by a spring 63 is contained in a slot in the upper portion of rear housing 22 above the pinion 38 and below plate 30 (Figures 1 and 29). The cover plate 62 is normally urged by the spring 63 to a position over the pinion 38 to close slot 36 protecting the pinion from falling dirt, steel particles, etc. The plate 62 has an inclined edge 64 (Figure 29), whereby on engagement by the wire, it moves away from the pinion, permitting knot to be ejected from the pinion slot, as will become more apparent hereinafter.

Bearings 58 and 60 are provided with slots 66 for receiving slidable guide fingers 68 and 70, respectively, which fit into the enlarged portion of slot 46 in the hubs 42 and 44, respectively, to confine the overlapped portions $W^1$ and $W^2$ of wire W therein prior to the knotting operation (Figures 27 and 29).

A recess 72 in rear housing 22 contains a pivotal lever 74 rigidly mounted on one end of a shaft 76 journaled in the rear housing (Figures 1, 10 and 11). The opposite end of shaft 76 carries a cam 78 which is disposed in a recess 80 in the rear housing 22. A rocker arm 82 is pivotally mounted in recess 80 (Figures 1 and 10). The upper end of the rocker arm is connected with guide fingers 68 and 70. The cam 78 cooperates with rollers 84 and 86 on the bottom of the rocker arm to move the guide fingers 68 and 70 out of or into the slot 46 in hubs 42 and 44 when the lever 74 is pivoted at the proper time in the tying cycle as will be more fully explained hereinafter.

Ejector units

Reference numerals 88 and 90 designate, generally ejector units disposed partially in rear housing 22 and partially in front housing 26 adjacent the left and right ends, respectively, of pinion 38 (Figures 1, 2, 8, 9 and 38). The units 88 and 90 are connected together by means of a rotatable spline shaft 92.

Left-hand ejector unit 88 includes a substantially L-shaped cam-follower 94 which is splined intermediate its ends to the shaft 92. One leg 96 of cam-follower 94 extends forwardly of shaft 92 and engages the bottom of a slide bar 98. The slide bar 98 is disposed for sliding movement on the front face of rear housing 22 in a vertical plane extending through the slot 36. The other leg 96' of the cam-follower extends upwardly of the spline shaft.

A lever 100 pivotally mounted intermediate its ends in front housing 26 is disposed adjacent the slide bar 98 and carries a slotted yoke 104 in its upper portion which is normally urged, by reason of the pivot point of lever 100 and a projecting toe portion 256 thereon, against a projecting portion 102 of bearing 58. This confines the ends of the overlapped portions $W^1$ and $W^2$ of wire W in the slot 106 of yoke 104 (Figures 8 and 27) so that they will not twist when the knot is formed as will be apparent hereinafter. The yoke 104 is disposed in a slot 105 in the lever 100 and is adjustable toward and away from the portion 102 of bearing 58 by means of a screw 108.

Right-hand ejector unit 90 is similar in construction to ejector unit 88 with the exception that a lever arm 110 is substituted for the L-shaped cam-follower 94. The other parts of ejector unit 90 which are similar to parts of ejector unit 88 have been designated by the same reference numerals primed. The yoke 104' of ejector unit 90 cooperates with a projection 112 of bearing 60 to confine the overlapped portions of wire W in the same manner that yoke 104 of ejector unit 88 cooperates with bearing portion 102 (Figures 9 and 27). Actuation of the cam-follower 94, as will be described hereinafter, causes simultaneous operation of the ejector units 88 and 90 to eject and cut the completed tie.

Drive assembly

A reversible hydraulic motor 114 is mounted on rear housing 22 at the right-hand end thereof as viewed in Figures 1, 2 and 5. The motor shaft 116 has a hub 118 splined thereto which is connected with an intermediate drive shaft 120 by a key-and-slot connection 122.

The rotation of motor shaft 116 in one direction is limited by an adjustable stop screw 124 which is adapted to be engaged by a detent 126 of hub 118 (Figure 7). Rotation of shaft 116 in the opposite direction is limited by means of an adjustable stop screw 128 which is adapted to be engaged by a detent 130 of hub 118. Stops 124 and 128 may be adjusted to limit the rotation of power shaft 116 and thereby control the rotation and positioning of twister pinion 38 as will become apparent as this description proceeds.

Intermediate shaft 120 is journaled in bearings 132 and 132' in rear housing 22 in alignment with motor shaft 116. A gear 134 is keyed to shaft 120 intermediate its ends (Figures 5 and 6). A drive shaft 136 is journaled in bearings 138 and 138' in rear housing 22, above and to the front of intermediate shaft 120. Each of the shafts 116, 120 and 136 is parallel with the path of the wire W through the knotter (Figure 5). A gear 140 is keyed to shaft 136 adjacent its right end as viewed in Figure 5 and meshes with gear 134 on intermediate shaft 120. Thus, the drive shaft 136 is driven by motor 114 through shaft 116 and intermediate shaft 120.

A twister gear 142 having a left-hand hub 144 and a right-hand hub 146 is rotatable on shaft 136 and meshes with twister pinion 38 (Figures 12, 13, 15 and 41). A cam 148 having a left-hand hub 150 is rotatable on shaft 136 adjacent the left hub 144 of gear 142 (Figures 5 and 12). Left hub 144 of gear 142 is provided with a recess 152 in which driving pawls 154 and 156 are pivotally mounted on pins 158 and 160, respectively (Figures 12, 13, 15, 41 and 42). Pawls 154 and 156 are spring biased against shaft 136 and are adapted to be engaged by a key 162 in the shaft to cause rotation of gear 142 along with shaft 136 at intervals during the knotting cycle.

Figure 42:
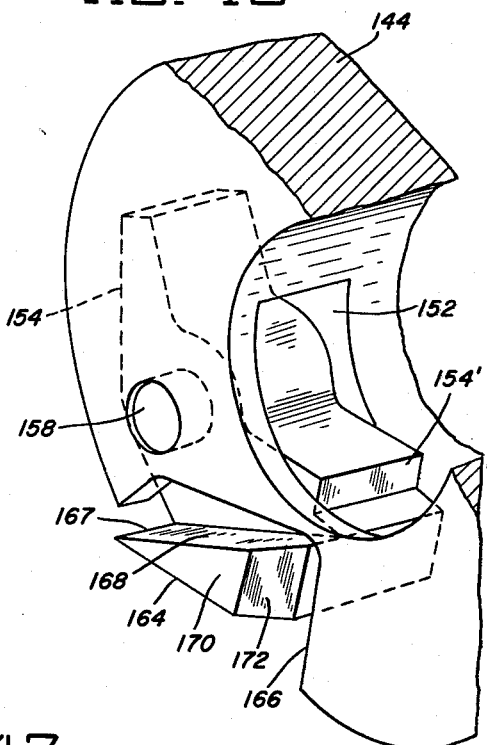
Figure 42 is a perspective view of the left hub of the twister gear with pawl.

Pawl 154 is engaged at its end 154' by key 162 when the shaft 136 is rotated in the clockwise direction, as viewed in Figure 13, to cause rotation of gear 142 in the clockwise direction. The end 154' of the pawl 154 is provided with a projection 164 which extends laterally through a slot 166 in the hub 144 toward the cam 148 (Figures 12, 16 and 42). The projection 164 is generally triangular in shape, the peak of the triangle 167 being disposed rearwardly and laterally of the end 154' of pawl 154. The projection is formed with an inclined upper bearing surface 168, a straight side bearing surface 170, and an inclined front bearing surface 172 (Figure 42).

The right hub 146 has spaced depressions 174 and 176 in its circumference for selectively receiving a spring-loaded ball detent 178 for maintaining the gear in either of two predetermined positions (Figures 12, 13, 15 and 41). Spring-loaded ball detent 178 is disposed in the rear housing 22 subjacent the right hub 146 (Figure 5).

The cam hub 150 is formed with a recess 180 in which a driving pawl 182 is pivotally disposed by means of a pin 184 (Figures 12 and 14). The pawl 182 is spring biased so that its end 182' is constantly urged against the circumference of shaft 136. The end 182' of pawl 182 is engageable by a key 186 in shaft 136 when the shaft is rotated clockwise, as viewed in Figure 14, during certain periods of the knotting cycle, as will be more fully explained.

A notch 188 is formed in the circumference of the hub 150 for receiving a spring-loaded wedge detent 190 which is disposed in the rear housing 22 subjacent hub 150 (Figures 12 and 14). The wedge detent 190, when in position in the notch 188, prevents rotation of the hub 150 in the counterclockwise direction. When the pawl 182 is engaged by key 186 to rotate hub 150 and cam 148 in the clockwise direction, as viewed in Figure 14, the wedge detent 190 is displaced from notch 188 by the inclined surface of the notch riding along the inclined surface of the wedge detent, as best shown in Figure 14.

A tripping member in the form of a spring-loaded pin 192 is disposed in a hole in the side of cam 148 adjacent left hub 144 (Figures 12 and 16). Pin 192 is normally urged outwardly of cam 148 toward left hub 144 by means of a spring 191.

The interrelated functioning of the twister gear 142, cam 148 and twister pinion 38 in forming a knot will now be described. Prior to the knotting operation, the twister gear 142 and cam 148 are in the positions shown in Figures 13 and 14, respectively. At this stage the twister pinion 38 is positioned with slot 46, ball detent 178 is seated in depression 174; and the wedge detent 190 is seated in notch 188. Before the start of the knotting operation, the wire W has been fed through the machine and the overlapped portions $W^1$ and $W^2$ thereof are in the slot 46 of twister pinion 38. At this time also, the wire W has been drawn about the bundle and has been tensioned therearound to the desired tautness.

To initiate the knotting operation, the hydraulic motor 114 is started to turn its shaft 116 and connected intermediate shaft 120 in clockwise direction as viewed looking toward the right in Figure 5. This causes counterclockwise rotation of shaft 136. The counterclockwise rotation of shaft 136 causes the key 162 to engage the end of pawl 156 and rotate gear 142 in the counterclockwise direction which in turn rotates twister pinion 38 in the clockwise direction (Figure 13). The ratio of twister gear 142 to pinion 38 is such that the latter rotates four revolutions for one revolution of the twister gear. Stop screw 128 is adjusted to permit the motor shaft 116 to cause sufficient rotation of gear 142 to achieve slightly more than 4¼ revolutions of the twister pinion to the position shown in Figure 41. During rotation of the twister pinion 38 the overlapped portions $W^1$ and $W^2$ of wire W contained in the pinion slot are twisted together to form a knot. Rotating the twister pinion slightly more than 4¼ revolutions results in the formation of a knot having 4¼ twists therein. If a knot having more or less than 4¼ twists is desired, the ratio between the gear 142 and pinion 38 may be varied to increase or decrease the number of complete revolutions the twister pinion will rotate for one revolution of the twister gear. An overtwist slightly beyond the 4¼ revolutions is required to relieve the torsion set up in the wire during twisting so that the knot may be easily ejected. The shaft 136 is rotated 1⅛ revolutions to rotate the twister pinion 4¼ revolutions. Figure 41 shows the relative positions of the pawls 154 and 156 of gear 142, the key 162 of shaft 136, and the twister pinion 38, after the shaft 136 has been rotated a sufficient amount to form the knot plus the necessary overtwist.

During the 1⅛ revolution rotation of shaft 136 and gear 142 (plus the additional fraction of a revolution necessary to give an overtwist) from the position shown in Figure 13 to the position shown in Figure 41 pawl 154 rests on the periphery of shaft 136. During the last part of this rotation of shaft 136 and gear 142 (after one revolution has been completed) the projection 164 of pawl 154 depresses pin 192 inwardly of the cam 148 against the tension of spring 191 by engaging it first by the laterally inclined surface 172 and then by rearwardly inclined surface 170 (Figures 13, 16, and 40). The pin remains depressed until surface 170 passes beyond it permitting pawl 154 to pass. After surface 170 has passed beyond the spring-loaded pin, the pin is released and springs out to bear against the outer face of left hub 144. After the gear 142 has thus been rotated slightly beyond 1⅛ revolutions and pinion 38 has been rotated slightly more than 4¼ revolutions to the position shown in Figure 41, rotation of motor shaft 116 is stopped by engagement of detent 130 with stop screw 128. The latter having been pre-adjusted to engage detent 130 at this point.

The motor 114 is then reversed to rotate motor shaft 116 in the counterclockwise direction. Counterclockwise rotation of shaft 116 causes clockwise rotation of shaft 136. Clockwise rotation of shaft 136 causes the key 162 to engage the end 154' of pawl 154 to rotate the gear 142 in the clockwise direction a slight amount to rotate pinion 38 to the position shown in Figure 15 and cause the surface 168 of projection 164 to engage the periphery of pin 192. As the surface 168 rides along the periphery of pin 192 the pawl 154 is lifted from engagement with key 162 so that pawl 154 no longer drives the gear 142. After the pawl 154 is released from engagement with key 162 the ball detent 178 enters the depression 176 to stop the gear 142 in the proper position to maintain the twister pinion in ejecting position with the slot 46 vertical as shown in Figure 15. The gear 142 thereafter remains stationary while the shaft 136 continues to rotate in the clockwise direction causing key 186 to engage the end 182' of pawl 182 (Figure 14). This causes rotation of cam 148 with pin 192 and hub 150. Rotation of hub 150 depresses wedge detent 190 through sliding engagement of the inclined surface of detent 190 with the inner surfaces of notch 188. During the rotation of hub 150, detent 190 rests on the outer periphery of the hub. When the pin 192 is carried away from pawl 154 as the cam 148 is rotated, the pawl is released from the pin and rises along the periphery of shaft 136 as the shaft rotates.

The clockwise rotation of shaft 136 continues until the cam 148 and hub 150 have rotated one complete revolution from the position shown in Figure 14. Upon completion of one revolution rotation of hub 150, the detent 190 re-enters the notch 188 to hold hub 150 stationary. The rotation of cam 148 effects operation of the ejector units 88 and 90 as will be described. During the final stage of clockwise rotation of shaft 136, key 162 engages the pawl 154 and rotates gear 142 to return twister pinion 38 from the ejector position shown in Figure 15 to the starting position shown in Figure 13. Thus, the twister pinion is moved from the position shown in Figure 41 back to initial position shown in Figure 13 in two steps separated by a dwell. During the dwell the cam 148 actuates the ejecting mechanism.

*Tiltable gripper*

A gripper 193 comprises a body 194 mounted for pivotal movement on the rear housing 22 by means of a shoulder bolt 196 (Figures 2 and 17). The gripper body pivots thru a predetermined small arc about bolt 196. Tilting of the body is limited by an adjustable stop screw 198 threaded into the rear housing 22 below the gripper body. A fixed jaw 200 is disposed in the upper portion of body 194 and cooperates with a movable jaw 202 carried by a lever 204 (Figure 17). Lever 204 is pivotally mounted intermediate its ends in the top of gripper body 194 by means of a fixed pin 206 (Figures 17, 39 and 40). The gripper body 194 is bored as at 208 to receive a cylinder 210 having a piston 210' slidable therein. The piston 210' is raised by pressure fluid supplied through a flexible hose 210'', in the proper sequence in the tying cycle, to cause lever 204 to grip the leading end of wire W between jaws 200 and 202 (Figures 2 and 17).

As best shown in Figures 18, 19, 21, 22, 39 and 40, when lever 204 is tilted on pin 206 to close or open the jaws, it shifts laterally at the same time to position movable jaw 202 over the fixed jaw 200 before closing, and to remove the movable jaw from its position over the fixed jaw when the jaws are opened. This lateral shifting of the lever 204 is achieved by means of cam blocks 212 and 218 in the gripper body co-acting with cam blocks 214 and 216 carried by the lever 204 (Figures 18 and 21). When the lever 204 is tilted counterclockwise the inclined surface of cam block 214 engages the inclined surface of cam block 218 causing the shifting of the lever laterally on pin 206 to shift the movable jaw into position over the fixed jaw, as shown in Figures 20, 21, 22 and 40. When the pressure in cylinder 210 is relieved the piston 210', descends in the cylinder and a spring-loaded rod 220 attached to the rearward end of lever 204 causes it to open the jaws. As the jaws open the inclined surface of cam 216 engages the inclined surface of cam 212 to cause lateral shifting of lever 204 to shift the raised movable jaw to one side of the fixed jaw, as shown in Figures 17, 18, 19 and 39.

A spring-loaded rod 222 attached by one end to the inner surface of front housing 26 and by its other end to the gripper body 194 normally urges the tiltable gripper to a forward and upright position bearing against the projection 112 of bearing 60 (Figure 27). When the tie wire W is fed into the tying machine, the leading end thereof strikes the inner wall of jaw 200 and tilts the gripper body 194 rearwardly. A switch cam 224 (Figures 6, 18, 39 and 40) is provided on the rear face of gripper body 194 for a purpose which will become apparent hereinafter.

Referring to Figures 1 and 23–25, a cover plate 242 is slidable in a slot 274 in the upper portion of front housing 26 adjacent gripper body 194. A top plate 276 is disposed over the slot 274 and is attached to housing 26 by means of screws 278. The sliding cover plate 242 is guided by the screws 278 which pass through elongated holes in the plate. Bushings 280 are placed on each of the screws 278 between top plate 276 and the bottom of slot 274 to insure free sliding movement of the plate 242.

Cover plate 242 is provided with a pocket 282 which contains gate lever 284 pivoted at one end (Figures 24 and 25). The lever 284 is biased downwardly by a spring 288. The free end of lever 284 is formed with a depending projection which functions as a deflector 290 and is adapted to be received into and to block groove 226 of jaw 200 when depressed. An integral heel projection 292 depends from the lever 284 adjacent deflector 290 and is adapted to fit into groove 244 (Figures 23, 24, 25 and 26). As the leading end of wire W passes through the knotter the first time, when the wire is being fed into the machine, the deflector 290 prevents it from entering into the groove 226 of jaw 200 and deflects it into groove 244. Then, as the leading end of the deflected wire moves in the groove 244 it strikes heel 292 which causes the lever 284 to pivot and raise deflector 290 out of groove 226 so that the leading end of wire W will pass into groove 226 when it passes through the knotter the second time during the feeding operation. In one extreme position, cover plate 242 covers both grooves 226 and 244 and in its opposite extreme position it is removed from over the two grooves.

*Operation*

A complete knotting operation will now be described. Certain functional steps carried on by the tying machine which are not performed by the knotting mechanism but are related thereto, will also be described in order to insure a clear understanding of the invention. In the following description reference is made to certain switches, solenoids and other elements of a control circuit illustrated in Figure 35. The control circuit will be described in detail hereinafter.

At the beginning of a tying cycle, the leading end of the wire W rests in the groove 226 in the lower jaw 200 of the gripper body 194 (Figure 27) and the loop of tie wire W lies in guide track 8 with overlapped portions $W^1$ and $W^2$ disposed in grooves 266 and 268, respectively, of guide block 10; in a groove 269 in knotter 2; and in the slot of the twister pinion 38 of the knotter (Figure 27). Groove 269 is formed in a block 271 affixed to the knotter adjacent the ejector unit 88 and is wide enough to accommodate both portions $W^1$ and $W^2$ of wire W. The overlapped portions $W^1$ and $W^2$ of the wire are guided on three sides and partially on the fourth by block 271 (Figures 3, 27, 28 and 32). The rear half of groove 269 is covered by a slidable cover 273 held in position by a spring 275. Cover 273 is slidable between block 271 and a fixed cover plate 277 spaced thereabove (Figure 3). Cover 273 and cover plate 277 extend into the knotter from guide block 10 (Figure 1). The cover 273 has a beveled edge so it is pushed away from over groove 269 by the portion $W^2$ of wire W when the wire is retracted and drawn around the bundle.

The knife 262 is disposed adjacent a cut-away at the inner end of block 271 and cooperates with cover 273 to confine the wires in groove 269 (Figures 1, 2, 27 and 32).

To start the tying cycle a switch 270 is tripped by any suitable means which causes the following to occur:

(1) Fluid under pressure is admitted to cylinder 210 to raise the piston 210' (Figure 17). This causes jaws 200 and 202 to grip the leading end of the wire as shown in Figure 20. The gripper body 194 has already been tilted backward at this stage, having been moved to this position by the driving force of the leading end of the wire W as it was fed into the machine at the end of the prior tying cycle.

(2) The feeding mechanism 16 is reversed to retract the wire W and draw it out of the guide track and around the package.

(3) A solenoid 228 is energized causing projection of a plunger 230 (Figures 1 and 11). When the plunger is projected it engages and pivots lever 74 to rotate cam 78 which rocks arm 82 to draw the guide fingers 68 and 70 from the slot 46 of the twister pinion 38 (Figures 10 and 11). As the lever 74 is pivoted, a pin 232 on the bottom thereof strikes a lever 234 to pivot it about a pin 236 (Figures 11 and 30). Lever 234 is disposed in a slot in the rear housing 22 below and rearwardly of the ejector units 88 and 90. A spring loaded rod 239 is carried by the end of the lever 234 remote from the pin 232. The rod 239 is connected with and actuates a lever 240. This lever is pivoted intermediate its ends and serves when tilted to shift cover plate 242 when the lever 234 is pivoted, to uncover groove 244 in the front housing 26 of the knotter and allow the wire to escape from the groove (Figures 27, 30 and 31). Groove 244 is normally parallel with groove 226 in the jaw 200 of gripper 193 (Figures 23, 24 and 25). (A spring-loaded plunger 272 returns the arm 74 to normal position after the tie has been made and ejected, to move pins 68 and 70 back into the slot 46 of twister pinion 38 (Figures 10 and 11).)

As the wire W is drawn around the bundle, the tension applied to the leading end thereof pulls the gripper body 194 to normal upright position. In such movement the switch cam 224 actuates a switch 246 through a slide bar 248 and a lever 250 (Figure 6). Switch 246 is housed in a switch box 252 mounted on the back surface of rear housing 22 (Figure 1). Actuation of switch 246 causes the feed mechanism 16 to disengage from the wire W and the wire W continues to retract under its own momentum. Actuation of switch 246 also starts operation of the tensioner 20.

Upon attainment of a predetermined tension in the wire W around the bundle, a switch 362 forming part of the tensioner is closed and the knotting operation is initiated as described hereinbefore in the description of the "Drive assembly."

After the knot has been formed and the twister pinion 38 has been turned to the ejection position, rotating cam 148 engages a roller 254 in the arm 96' of the cam follower 94 which causes rotation of shaft 92 (Figure 38). When the shaft 92 is thus rotated, arms 96 and 110 are elevated simultaneously to cause upward movement of slide bars 98 and 98' of ejector units 88 and 90, respectively. As the slide bars 98 and 98' rise, the bottom ends thereof move out of engagement with heels 256 and 256' of levers 100 and 100', respectively, and their upper ends strike yokes 104 and 104' to pivot levers 100 and 100' and swing the yokes away from the knotted wire. Figures 8 and 9 show both ejector units before ejection and Figure 38 shows ejector 88 after ejection.

As the slide bar 98 moves upwardly, its upper end 260 engages the overlapped portions W¹ and W² of the wire W. As the slide bar 98 continues to rise it cooperates with the knife 262 mounted in front housing 26, to sever the wire portion W¹ (Figures 28 and 32). As the knotted and cut tie T is ejected, it engages the tapered edge 64 of pinion cover plate 62 to move the plate out of the way. As the cam 148 continues to rotate after engaging the roller 254, it engages the roller 264 to return the ejector units 88 and 90 to inactive position, as shown in Figures 8 and 9.

After the cutting and ejecting of the completed tie, pinion 38 is rotated ¼ revolution counterclockwise by gear 142 to position the side opening of slot 46 in a horizontal plane for receiving guide fingers 68 and 70. At the same time a switch 308 is opened when its spring-loaded plunger 310 enters a recess 312 in shaft 120 (Figures 1 and 35). Opening of switch 308 causes solenoid 228 to become deenergized so that lever 74 is forced back to normal initial position by spring-loaded plunger 272 to cause guide fingers 68 and 70 to enter slot 46 of pinion 38 and the recovering of grooves 226 and 244 by cover plate 242 (Figures 10 and 11).

Control circuit

Figure 35 illustrates diagrammatically a control circuit for an automatic wire-tying machine having the knotter of the invention installed therein. This control circuit, which will now be described, illustrates the several operations of the tying cycle of the wire-tying machine wherein the knotter of the invention is involved.

Pressure fluid for the hydraulic motor 114, tiltable gripper 193, and the cylinder 314 of tensioner 20 is supplied from a reservoir 316 by a pump 318. The flow of fluid to the motor, gripper and tensioner cylinder is controlled by solenoid-operated valves 320, 322 and 324, respectively. Valve 320 is operated from a neutral position toward the right by a solenoid 326 and to the left by a solenoid 328 to rotate intermediate shaft 120 in a counterclockwise direction for twisting the knot and in a clockwise direction for ejecting the completed knot, respectively, as described hereinbefore in the operation of the drive assembly. The stem of valve 324 is moved to the left and right by solenoids 330 and 332, respectively, to retract and project the piston rod 314' of tensioner cylinder 314. Projection of piston rod 314' causes the jaws 334 of the tensioner 20 to close on the wire W and tension the wire around the bundle at the proper time during the tying cycle. The stem of valve 322 is moved to the left by a solenoid 336 to close the jaws of gripper 193 at the proper time in the tying cycle. Opening of the gripper jaws is effected by spring means described above in the description of the tiltable gripper.

The control circuit includes two holding relays 338 and 340, each of which is a two-position relay having two solenoid coils 342, 344 and 346, 348, respectively. The operation of these relays is such that when one coil of the relay is energized, the relay contacts move from one extreme position to another. After operation, the relay contacts remain in the position to which they were actuated by the last energization of the one coil, until the opposite coil of the relay is energized. In operation of the tying machine, before the tying cycle begins the wire W has been fed into the machine and is ready to be retracted and drawn around the bundle B as explained hereinbefore.

Operation of the control circuit will now be described. To initiate the tying cycle, the switch 270 is momentarily closed by any suitable means as, for example, by movement of the bundle B into tying position. When switch 270 is closed a circuit is completed to coil 342 of relay 338 so that coil 342 is energized. Energization of coil 342 causes the opening of contacts 350 and 352 and the closing of contacts 354 and 356 of relay 338. At the same time a circuit is completed to coil 346 of relay 340 energizing coil 346, opening contacts 358, and closing contacts 360.

The opening of contacts 352 de-energizes solenoid 328 of valve 320 and permits the stem of the valve, which is of the spring-return type, to move back to neutral position shutting off the flow of fluid to motor 114. The opening of contact 352 also de-energizes solenoid 330 of valve valve 324 to permit retraction of the piston rod 314' and opening of the jaws 334 of the tensioner 20. The closing of contact 356 energizes solenoid coil 228 which causes the retraction of fingers 68 and 70 from the slot 46 of pinion 38 and the removal of cover 242 from over the wire W in the groove 244. The closing of contact 360 energizes solenoid coil 336 of valve 322, causing the closing of the jaws of the gripper 193 on the leading end of wire W.

At this point, feed mechanism 16 (not shown in Figure 35) is actuated in reverse to retract the wire W to draw it around the bundle B as explained hereinbefore. As the wire W is retracted, the gripper 193 is tilted to upright normal position, stopping the retraction of the wire W (by means not shown) and closing the switch 246. Closing of switch 246 completes a circuit to solenoid coil 332 of valve 324 to shift the stem of the latter to the right which causes projection of the piston rod 314' of tensioner 20 and tensioning of the wire W around the bundle B.

After the desired amount of tension has been imparted to the wire W, cylinder 314 of tensioner 20 closes the contacts of switch 362. The closing of switch 362 energizes solenoid coil 326 of valve 320 controlling motor 114 and causes counterclockwise rotation of shaft 136 to form the knot as described above in the description of the operation of the drive assembly of the knotter. The counterclockwise rotation of shaft 136 continues until shaft 116 is restrained by stop means 130. During the knotting operation switch 296 is closed when the pin 298 thereof enters a recess 300 in shaft 120. The closing of switch 296 energizes coil 348 of relay 340 to cause the reclosing of contact 358 and re-opening of contact 360. Opening of contact 360 causes the de-energization of the solenoid coil 336 of valve 322 to relieve pressure fluid from the cylinder of gripper 193 so that the jaws thereof are opened by the spring means provided for the purpose as described hereinbefore.

At the end of the twisting rotation of shaft 120, switch 302 is closed by its plunger 304 entering a recess 306 in shaft 120. Closing of switch 302 energizes coil 344 of relay 338 which causes re-opening of contacts 354 and 356 and re-closing of contacts 350 and 352. Re-opening of contact 354 de-energizes solenoid coil 326 of valve 320 which stops the flow of fluid to motor 114. The re-opening of contact 356 de-energizes solenoid coil 332 of valve 324 which abruptly stops the tensioner 20 and causes the re-opening of switch 362.

The re-closing of contact 352 completes a circuit to solenoid coil 328 of valve 320 to shift the stem of the valve to the left to cause "eject" rotation of the motor 114 and shaft 120 to begin. The re-closing of contact 352 also energizes solenoid coil 330 of valve 324 to cause opening of the jaws and retraction of the piston rod of tensioner 20. The "eject" rotation (clockwise) of motor 114 and shaft 120 continues until restrained by the stop means 128 described above, in the description of the operation of the drive assembly.

At the end of the "eject" rotation of shaft 120, the plunger 310 of switch 308 enters recess 312 in shaft 120 and causes opening of switch 308. The opening of this normally closed switch de-energizes solenoid coil 228. The de-energization of solenoid coil 228 causes pins 68 and 70 to re-enter the slot 46 of pinion 38 and cover 242 to move into covering position over groove 244. The machine is then ready for receiving another supply of tie wire preparatory to the next tying cycle.

The following is a summary of the operation of the knotter of the invention.

(1) Switch 270 is tripped manually or by movement of a bundle. This causes:
    (a) Gripper 193 to grip the leading end of the tie wire.
    (b) Feeding mechanism 16 to be reversed to retract tie wire.
    (c) Guide fingers 68 and 70 to be withdrawn from slot 46 of the twister pinion 38, and cover plate 242 to be shifted to uncover groove 244 in the front housing.

(2) Gripper body 194 is pulled forward to upright position by the retracting wire and movement of the gripper body causes tripping of switch 246 which causes:
    (a) Feeding mechanism 16 to disengage from wire but wire continues to retract under its own momentum.
    (b) Tensioner 20 to be actuated.

(3) After desired tension has been reached switch 362 on tensioner 20 is tripped to start motor 114 which rotates shafts 116 and 120 clockwise and shaft 136 counterclockwise.
    (a) Twister gear 142 rotates twister pinion 38 to form the knot plus a small amount of overtwist. When this point is reached rotation of shafts 116, 120 and 136 is stopped by engagement of detent 130 with stop screw 128.
    (b) Cylinder of tensioner 20 is de-energized.
    (c) Gripper 193 releases wire end.

(4) Motor 114 is reversed to rotate twister pinion 38 to ejection position and rotate cam 148 to operate ejector units 88 and 90 to cut and eject the completed tie T.
    (a) Cam 148 returns the ejector units to inactive position.
    (b) Gear 142 rotates twister pinion ¼ revolution to position radial slot 46 in horizontal position to receive guide fingers 68 and 70.
    (c) Guide fingers 68 and 70 re-enter slot 46.

(5) Motor 114 is stopped and feeding of wire into the machine is initiated. The machine is then ready for the next knotting operation wherein all the above steps are repeated.

While one embodiment of our invention has been shown and described, it will be apparent that other adaptations and modifications may be made without departing from the scope of the following claims.

We claim:

1. In a wire-tying machine including a knotter housing, and a twister pinion journaled therein having a radial slot extending the entire length thereof, the combination therewith of a guide finger slidable in said housing having a portion adapted to enter said slot when in tie-receiving position, means constantly urging said finger toward said pinion, and electromagnetic means for pulling said finger away from said pinion.

2. In a wire-tying machine, the combination therewith as defined by claim 1 characterized by means including a motor for driving said pinion, and switch means actuated by rotation of said motor controlling said electromagnetic means.

3. In a wire-tying machine, the combination therewith as defined by claim 1 characterized by said housing having an open topped tie-receiving groove aligned with the slot in the pinion, a cover plate slidable on said housing adapted in one position to overlie said groove, means constantly urging said cover plate toward said position, and means whereby said electromagnetic means retracts said cover plate.

4. In a wire-tying machine, an upstanding guide track adapted to receive and hold a loop of wire pushed therearound, means for pushing wire around said track to form a loop, a gripper mounted adjacent the track to receive the wire end after completion of the loop, said gripper having a movable jaw, means causing the jaw to close on the wire end, electro-magnetic means for controlling the jaw closing means, and a switch controlling the electromagnetic means.

5. Apparatus as defined by claim 4 characterized by said jaw-closing means including a fluid-pressure cylinder and piston.

6. Apparatus as defined by claim 4 including a twister pinion journaled in said machine, said gripper being adjacent but spaced from one end of said pinion and pivoted for angular movement from and toward said pinion.

7. Apparatus as defined by claim 6 including means for retracting one end of said loop thereby tilting said gripper, means for tensioning said loop, and means actuated by tilting of the gripper to cause operation of said tensioning means.

8. In a wire-tying machine, a twister pinion journaled therein, a shaft journaled adjacent said pinion, reversible power means for driving the shaft selectively in opposite directions through a limited angle, a gear loose on said shaft meshing with said pinion, pawls pivoted on said gear adapted to be engaged by an abutment on said shaft to drive the gear, means for tensioning a tie, and means operable on the development of a predetermined tension in said tie by said tensioning means for starting said power means.

9. In a wire-tying machine, a twister pinion journaled therein, a shaft journaled adjacent said pinion, reversible power means for driving the shaft selectively in opposite directions through a limited angle, a gear loose on said shaft meshing with said pinion, pawls pivoted on said gear adapted to be engaged by an abutment on said shaft to drive the gear, a cam loose on said shaft adjacent said gear, a tripping member displaceably mounted in said cam and extending toward said gear, one of said pawls having a portion projecting toward said cam so as to be engaged by said tripping member, whereupon the tripping member tilts said one of said pawls out of driving engagement with its abutment.

10. Apparatus as defined by claim 9 in which said projecting portion has a beveled edge adapted to engage and displace said tripping member.

11. Apparatus as defined by claim 9 including an additional pawl carried by said cam engageable by an additional abutment on said shaft, and means actuated by said cam for ejecting a tie from said pinion.

12. Apparatus as defined by claim 11 including means yieldably holding said cam against rotation until said additional pawl is engaged by said additional abutment.

13. In a wire-tying machine, a twister pinion journaled therein, a shaft journaled adjacent said pinion, reversible power means for driving the shaft selectively in opposite directions through a limited angle, a gear loose on said shaft meshing with said pinion, means whereby on rotation of said shaft in one direction, said gear is driven through an angle sufficient to rotate the pinion through a plurality of complete turns plus a fraction of a turn, and means whereby on reversal of said shaft said gear is driven through an angle sufficient only to reverse the pinions through said fraction of a turn.

14. Apparatus as defined by claim 13 including means for interrupting operation of said last mentioned means whereby said pinion is reversed in two steps separated by a dwell.

15. Apparatus as defined by claim 14 including means for ejecting a tie from said pinion, and means operated by said shaft for actuating said ejecting means during said dwell.

16. In a wire-tying machine, a knotter housing, a twister pinion journaled in said housing having a radial slot extending longitudinally therethrough adapted to receive the lapped ends of a wire tie and twist them together, the combination therewith of a yoke displaceably mounted adjacent each end of the pinion having a slot normally aligned with the pinion slot adapted to receive said lapped ends and hold them against twisting in spaced regions, an ejector bar slidable in said housing adjacent each end of the pinion, means for reciprocating said bars, and means whereby said bars on executing an ejecting stroke cause withdrawal of said yokes from said lapped ends.

17. Apparatus as defined by claim 16 including a lever pivoted in said housing adjacent each end of the pinion, said yokes being mounted on said levers, respectively.

18. Apparatus as defined by claim 17 including means for adjusting the yokes on said levers.

19. Apparatus as defined by claim 17 in which said last-mentioned means are cam surfaces on the ejector bars adapted to engage cooperating surfaces on the yokes.

20. Apparatus as defined by claim 17 including means whereby said bars on retraction from ejecting position actuate said levers to restore said yokes to normal position.

21. Apparatus as defined by claim 20 in which said lever-actuating means include cooperating cam surfaces on said levers and bars.

22. In a wire-tying machine, an upstanding guide track to receive and hold a loop of wire, means for pushing wire around the track to form a loop, a knotter housing having a groove forming a portion of said track, a tiltable gripper pivoted on said housing having a groove extending alongside said housing groove adapted to receive the wire, a cover plate overlying coacting portions of said gripper and housing, a gate lever pivoted in said plate, said lever having means to normally block the groove in the gripper and means engaged by the advancing wire end to tilt said lever and withdraw the blocking means from the groove in the gripper.

23. In a wire-tying machine, an upstanding guide track to receive and hold a loop of wire, means for pushing wire around the track to form a loop, a knotter housing having a groove forming a portion of said track, a twister pinion journaled in said housing having a slot aligned with said groove, an ejector bar slidable between said pinion and said groove, and a cover plate slidable in said housing above said groove, said cover plate having means whereby it is displaced laterally on operation of said bar to eject a tie.

24. Apparatus as defined by claim 23 including a wire-cutting knife projecting partly over said groove, said cover plate normally abutting the projecting end of said knife.

25. In a wire-tying machine, a twister pinion, a motor for driving said pinion, a hydraulic tie tensioner, a gripper for holding the free end of a tie during tensioning, and means actuated by said motor during operation of the pinion to cause said gripper to release said end.

26. In a wire-tying machine, a twister pinion, a reversible motor, means driven by said motor when operating in one direction to drive said pinion to form a tie, tie-ejecting means, means driven by the motor when operating in the other direction to actuate said ejecting means, and means actuated on completion of a tie to effect reversal of said motor.

27. In a wire-tying machine, a knotter housing, a twister pinion journaled in said housing having a radial slot extending longitudinally therethrough adapted to receive the lapped ends of a wire tie and twist them together, the combination therewith of a cover plate slidable in said housing above said pinion, knot-ejecting means slidable in said housing, and means whereby said cover plate is displaced laterally on ejection of a knot from said pinion slot.

References Cited in the file of this patent
UNITED STATES PATENTS
| | | |
|---|---|---|
| 2,129,063 | Kind | Sept. 6, 1938 |
| 2,194,108 | Wright | Mar. 19, 1940 |